US007060893B1

United States Patent
Villi

(10) Patent No.: US 7,060,893 B1
(45) Date of Patent: Jun. 13, 2006

(54) RACEWAY CONSTRUCTION FOR CABLES AND PIPES, INCLUDING AN ANTISLIPPING COVER

(75) Inventor: Piergiorgio Villi, Milan (IT)

(73) Assignee: Canalplast S.p.A., Milan (IT)

( * ) Notice: Subject to any disclaimer, the term of this patent is extended or adjusted under 35 U.S.C. 154(b) by 0 days.

(21) Appl. No.: 11/151,001

(22) Filed: Jun. 13, 2005

(30) Foreign Application Priority Data

Apr. 14, 2005 (IT) .......................... MI2005A0647

(51) Int. Cl.
*H02G 3/04* (2006.01)

(52) U.S. Cl. ...................... 174/48; 174/68.1; 174/68.3; 174/97; 439/207; 248/68.1; 52/220.5

(58) Field of Classification Search ................. 174/48, 174/68.1, 68.3, 49, 97; 439/207; 248/205.1, 248/68.1; 52/220.5, 220.7, 220.9
See application file for complete search history.

(56) References Cited

U.S. PATENT DOCUMENTS 5,024,251 A * 6/1991 Chapman ..................... 138/92
6,437,243 B1 * 8/2002 VanderVelde et al. ..... 174/68.3

* cited by examiner

*Primary Examiner*—Dhiru R. Patel
(74) *Attorney, Agent, or Firm*—Hedman & Costigan; James V. Costigan

(57) ABSTRACT

A raceway construction with an antislipping cover, specifically designed for holding cables, pipes and the like, a section member including a bottom wall and two sidewalls, which can be closed by a cover, and being characterized in that said raceway construction further includes interference means between the edges of the sidewalls and the cover, adapted to prevent the cover from slipping with respect to the edges of the sidewalls.

2 Claims, 7 Drawing Sheets

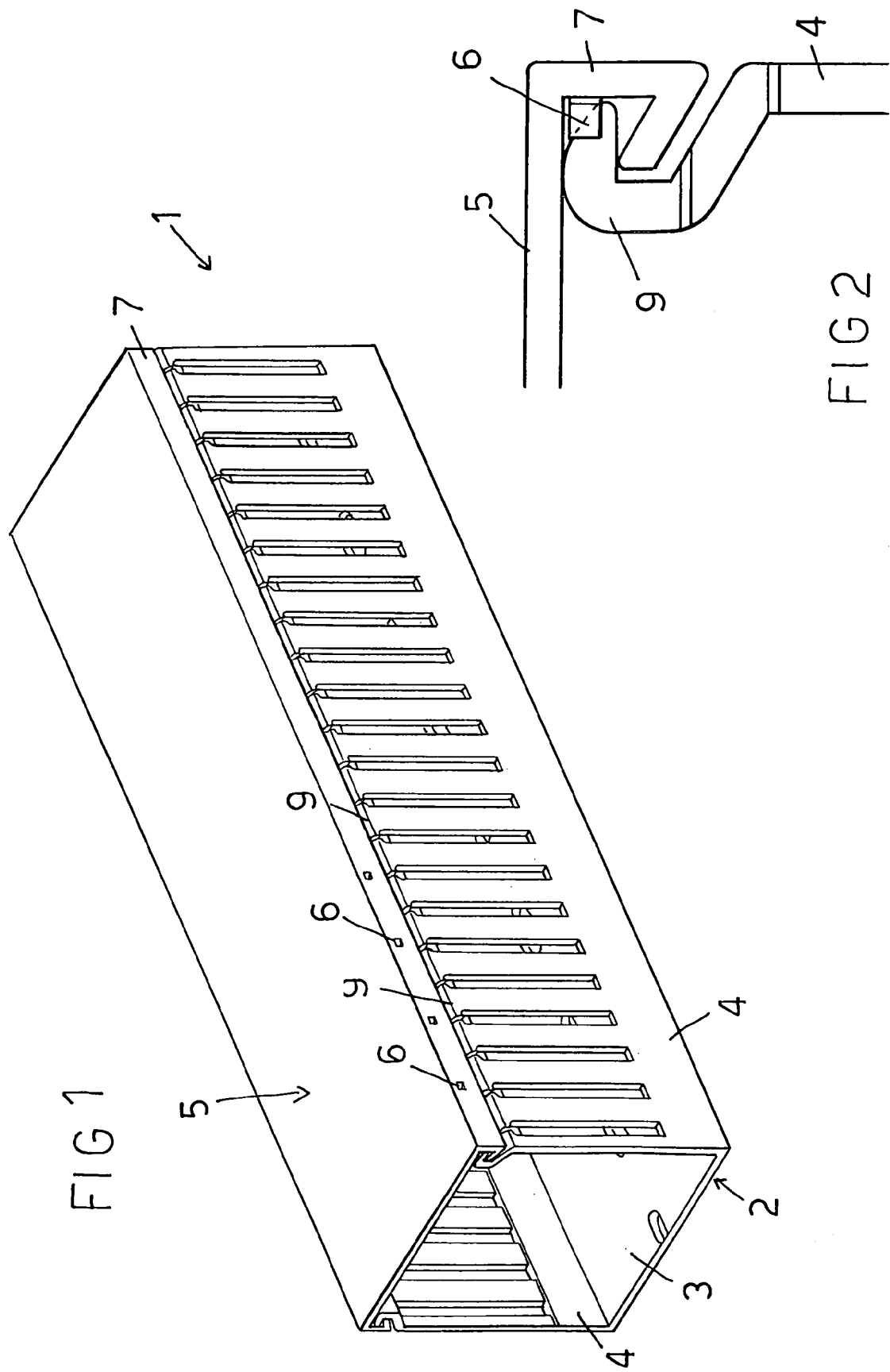

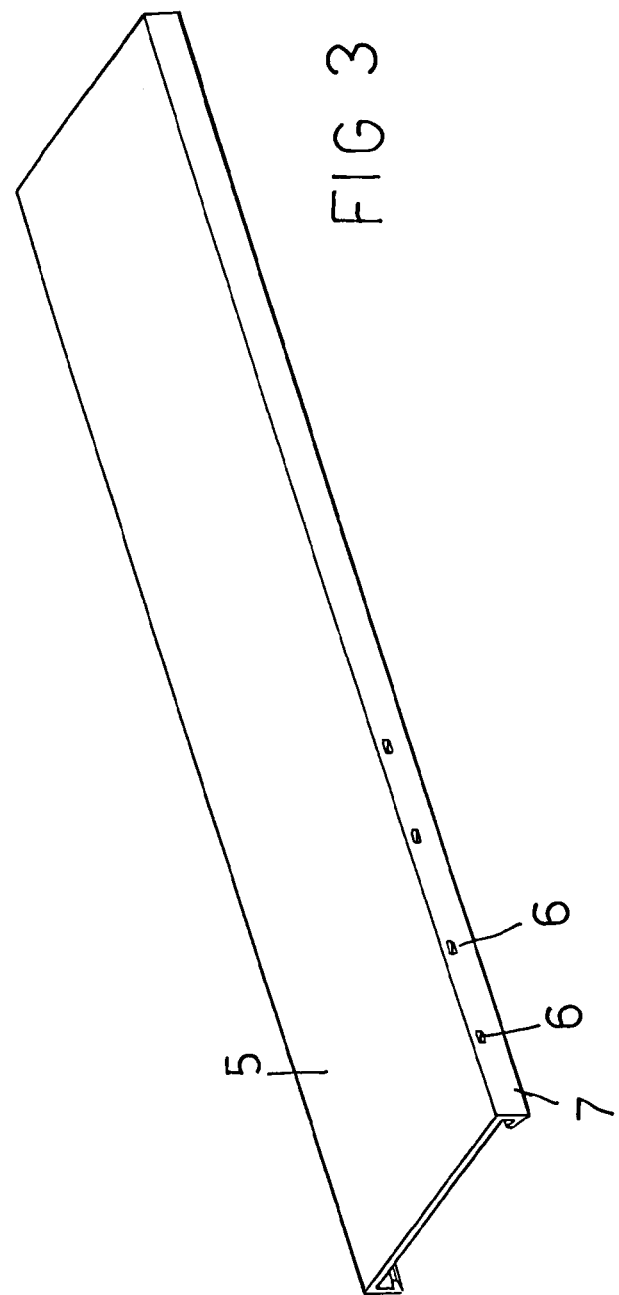
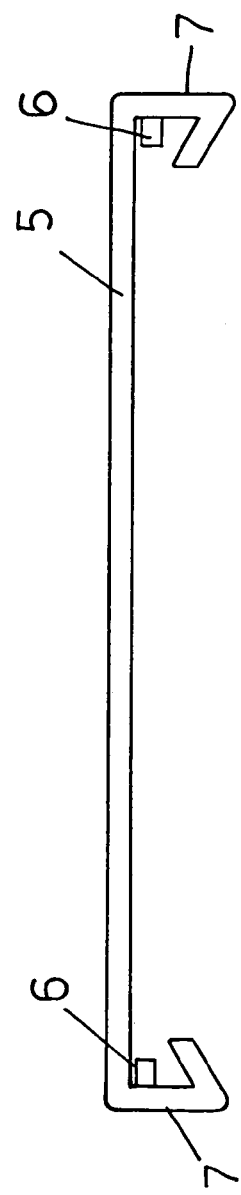

RACEWAY CONSTRUCTION FOR CABLES AND PIPES, INCLUDING AN ANTISLIPPING COVER

BACKGROUND OF THE INVENTION

The present invention relates to a raceway construction including an antislipping cover, particularly for holding cables, pipes and the like.

In raceway constructions used in electric panels and/or apparatus control panels, and in other applications affected by vibrations, or in apparatus transport operations, the cover elements assembled on said raceway constructions can slip and consequently fall away, thereby uncovering the electric cable holding channel.

SUMMARY OF THE INVENTION

Accordingly, the aim of the present invention is to provide a raceway construction having antislipping properties, thereby preventing its cover from slipping away.

Within the scope of the above mentioned aim, a main object of the invention is to provide such a raceway construction including an antislipping cover which can be installed in a very easy and quick manner.

Another object of the present invention is to provide such a raceway construction which is very reliable and safe in operation.

According to one aspect of the present invention, the above mentioned aim and objects, as well as yet other objects, which will become more apparent hereinafter, are achieved by a raceway construction with an antislipping cover, particularly adapted to hold cables, pipes and the like, comprising a section member including a bottom wall and two sidewalls, which can be closed by a cover, characterized in that said raceway construction comprises moreover interference means between edge portions of said sidewalls and said cover, adapted to prevent said cover from slipping away from the edges of said sidewalls.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example, in the accompanying drawings, where:

FIG. 1 is a perspective view of a length of a raceway construction according to the present invention;

FIG. 2 is a cross-section view illustrating in a detailed manner a detail of boss or nail element and of the operation of tooth elements thereof;

FIG. 3 is a perspective view illustrating the cover of the raceway construction according to the invention;

FIG. 4 is a front elevation view of the cover of the raceway construction;

DESCRIPTION OF THE PREFERRED EMBODIMENTS

Figure 5:
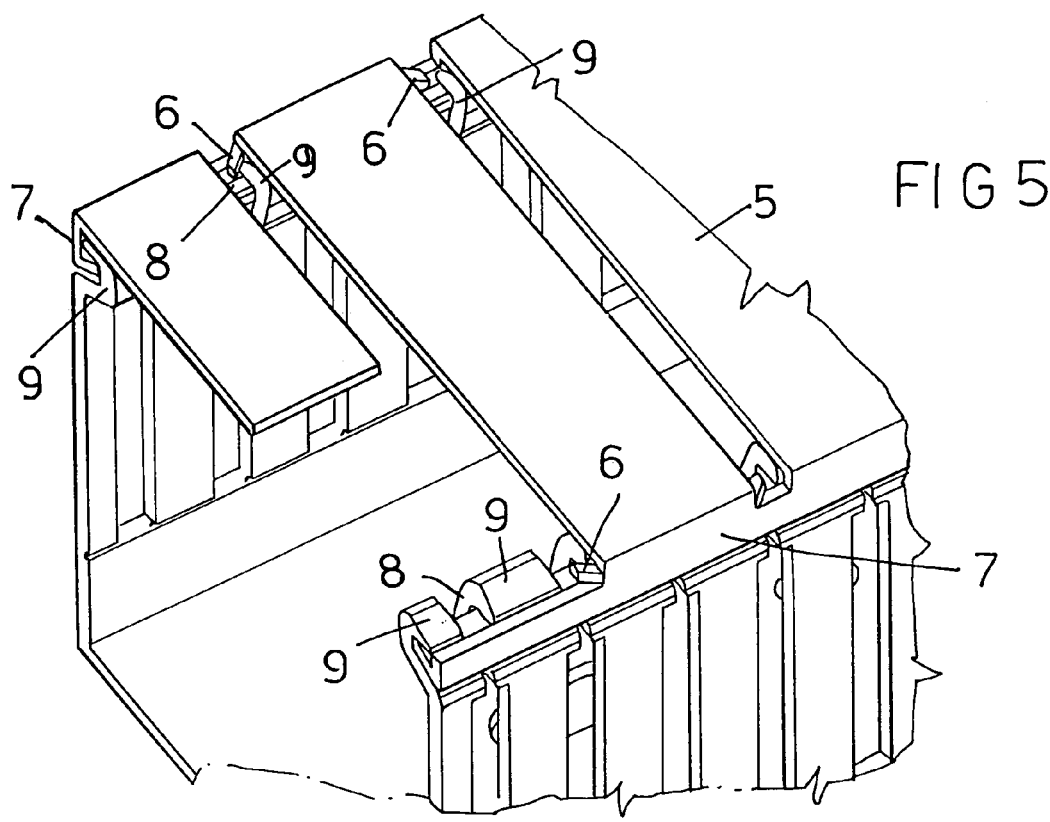
FIG. 5 is a broken away perspective view of the cover applied to the raceway construction.
Figure 6:
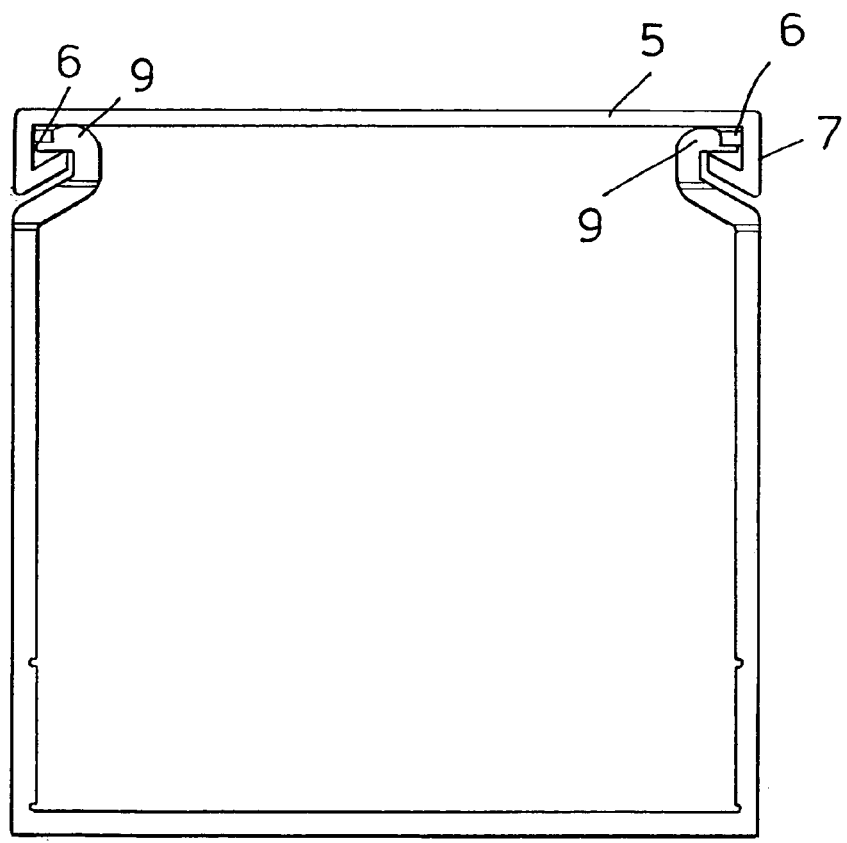
FIG. 6 is a front elevation view of the raceway construction according to the invention.
Figure 7:
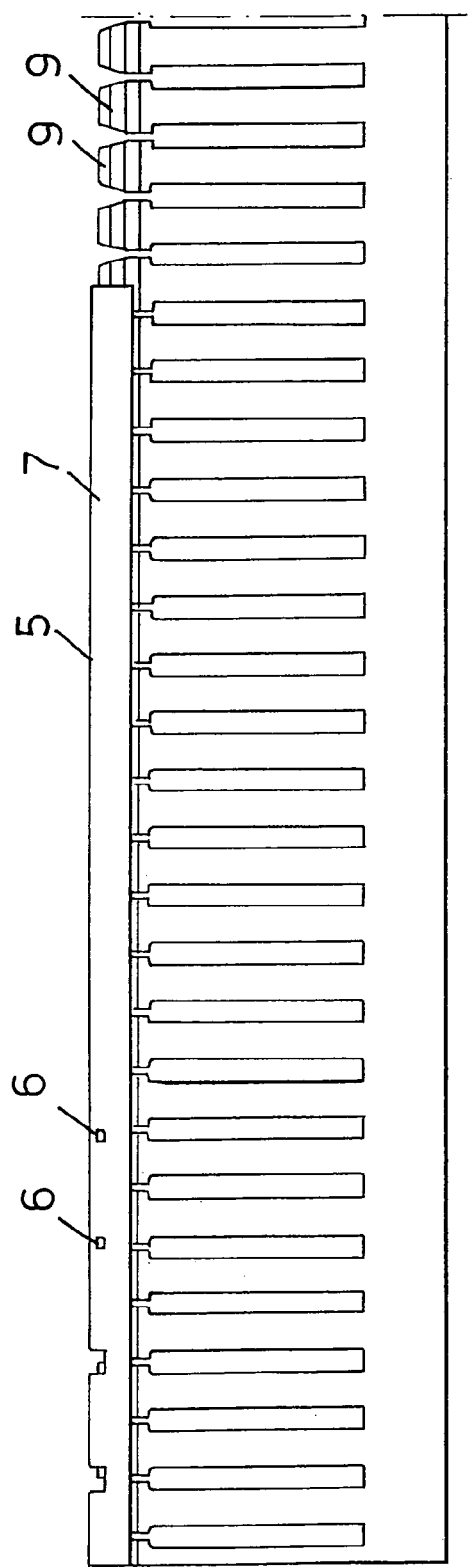
FIG. 7 is a side elevation view of the raceway construction.
Figure 8:
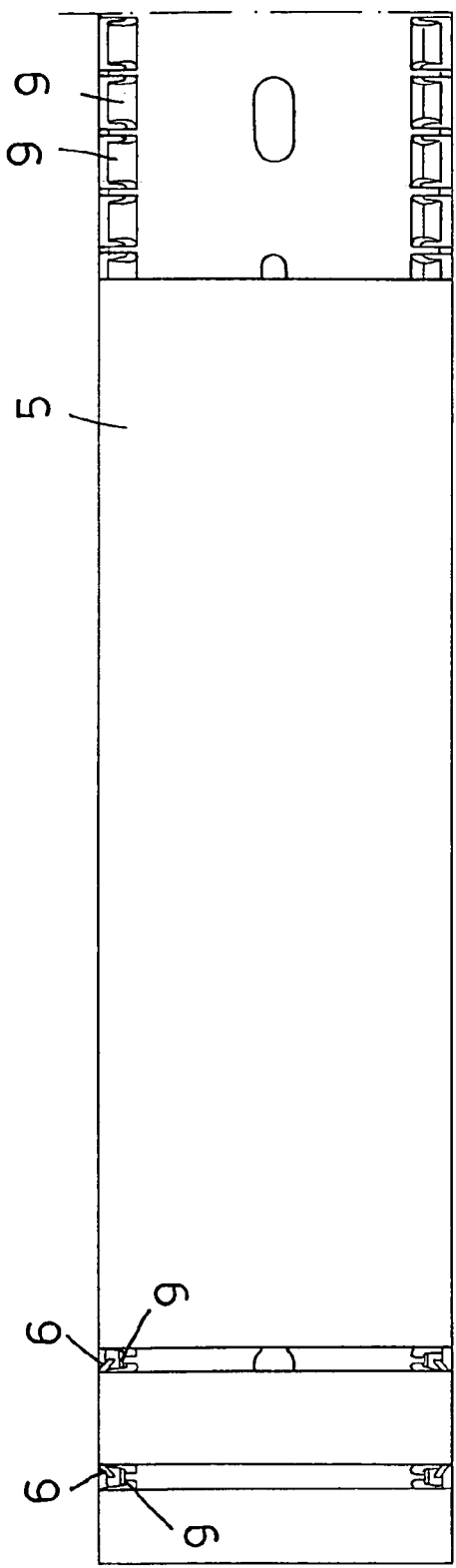
FIG. 8 is a top plan view, partially broken away, of the raceway construction.

With reference to the number references of the above mentioned figures, the raceway construction according to the present invention, which has been generally indicated by the reference number 1, comprises a section member 2, including a bottom wall 3 and two sidewalls 4, and which can be closed by a cover element 5. As shown, the side-walls 4 define a plurality of top adjoining curved hook or tooth elements 9, each tooth element 9 being separated by an adjoining tooth element by a respective cavity or slot 8.

According to the invention, the raceway construction comprises moreover interference means between the edge portions of the sidewalls and the cover, said interference means being adapted to prevent the cover from slipping away from the edges of the sidewalls.

More specifically, and with reference to FIGS. 1 to 8, said interference means comprise a plurality of inwardly directed bosses or nails 6 arranged along the sides or downward turned edge portions 7 of the cover 5.

Said bosses or nails 6 can be arranged between said cavities or slots 8 of said tooth elements 9 of the section member side walls, thereby preventing the cover from slipping away.

In particular, said bosses 6 are preferably made by a shearing operation along the sides of the cover, by half-removing material and are so arranged that one boss is oppositely arranged with respect to a cooperating boss.

The bosses or nails 6 are advantageously of an asymmetrical configuration, thereby one is adapted to make contrast within another, thereby providing an obstacle to a possible slipping movement of the cover in both directions.

Figure 9:
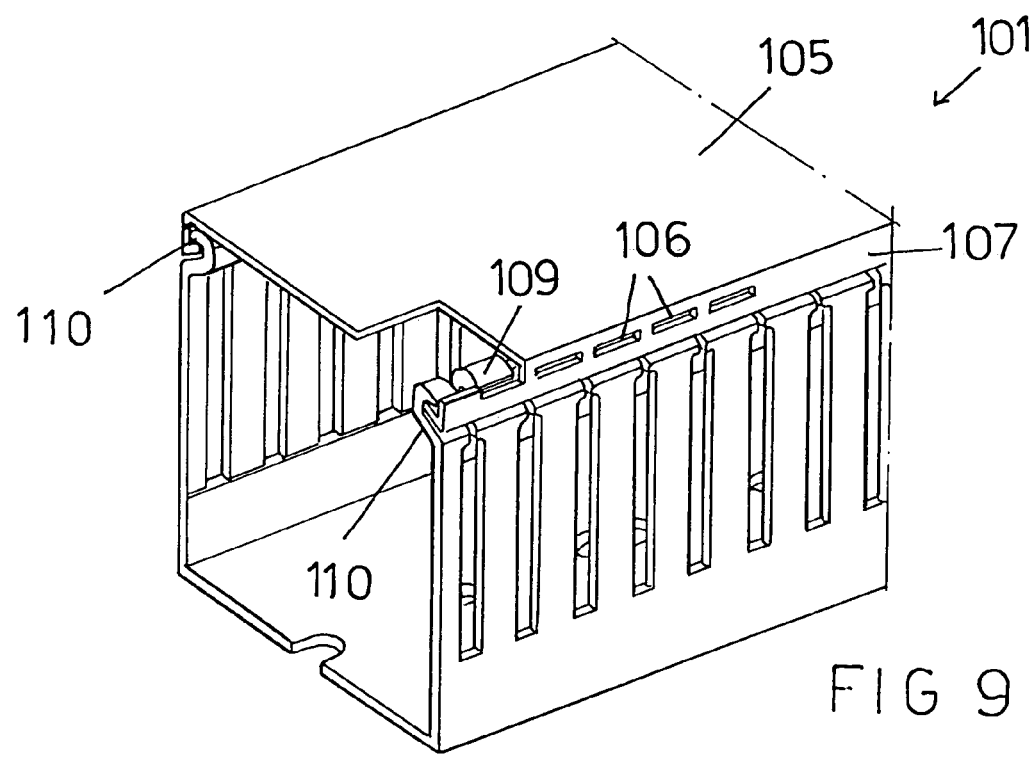
FIG. 9 is a broken away perspective view of the cover applied to the raceway construction, according to a further aspect of the present invention.
Figure 10:
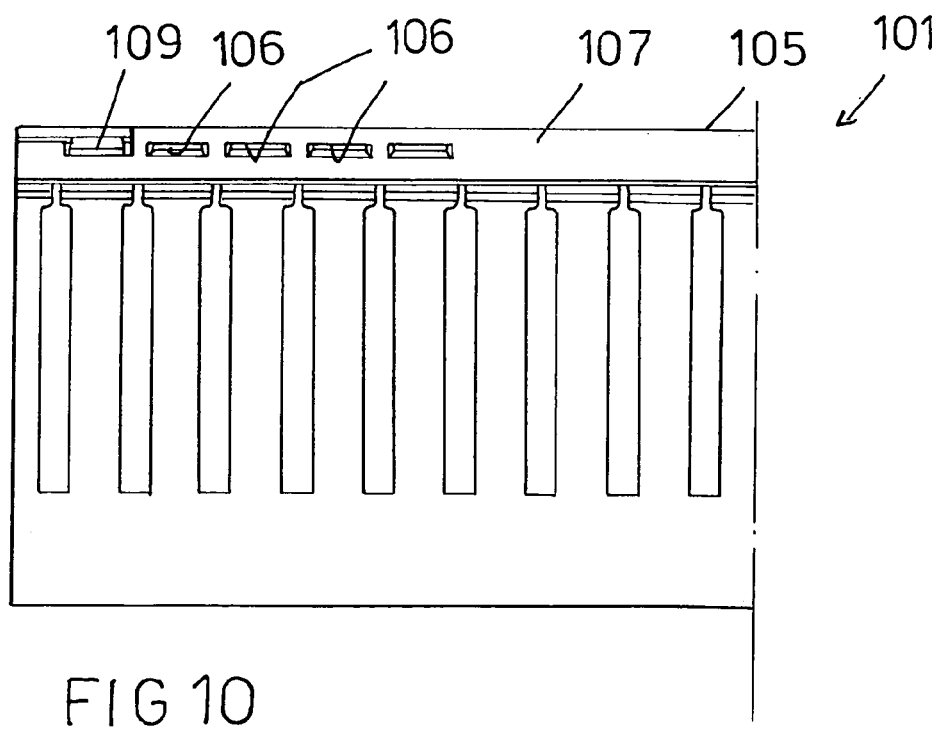
FIG. 10 is a side elevation view of the raceway construction shown in the preceding figure.

FIGS. 9 and 10 show a raceway construction 101 including interference or hindering means according to a further aspect of the invention, which interference means comprise throughgoing cavities 106 formed on the sidewall or downward turned edge portion 107 of the cover 105, thereby said tooth elements 109 or hook elements 110 are adapted, upon deforming, to mutually engage thereby providing the antislipping effect for said cover.

Figure 11:
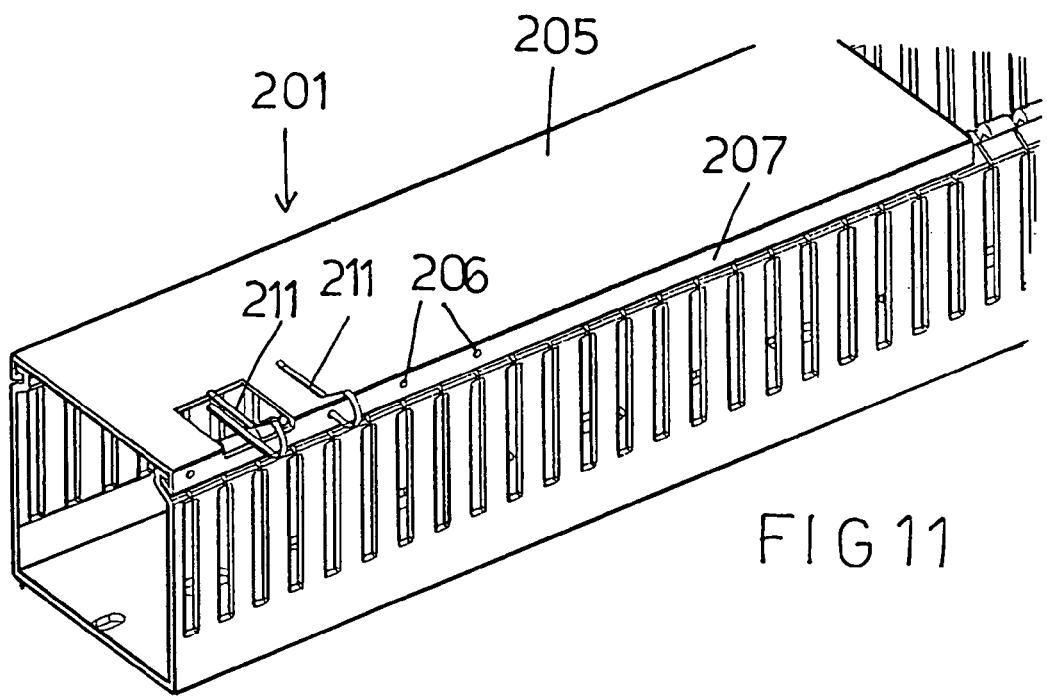
FIG. 11 is a further broken away perspective view of the cover applied to the raceway construction according to a further aspect of the invention.
Figure 12:
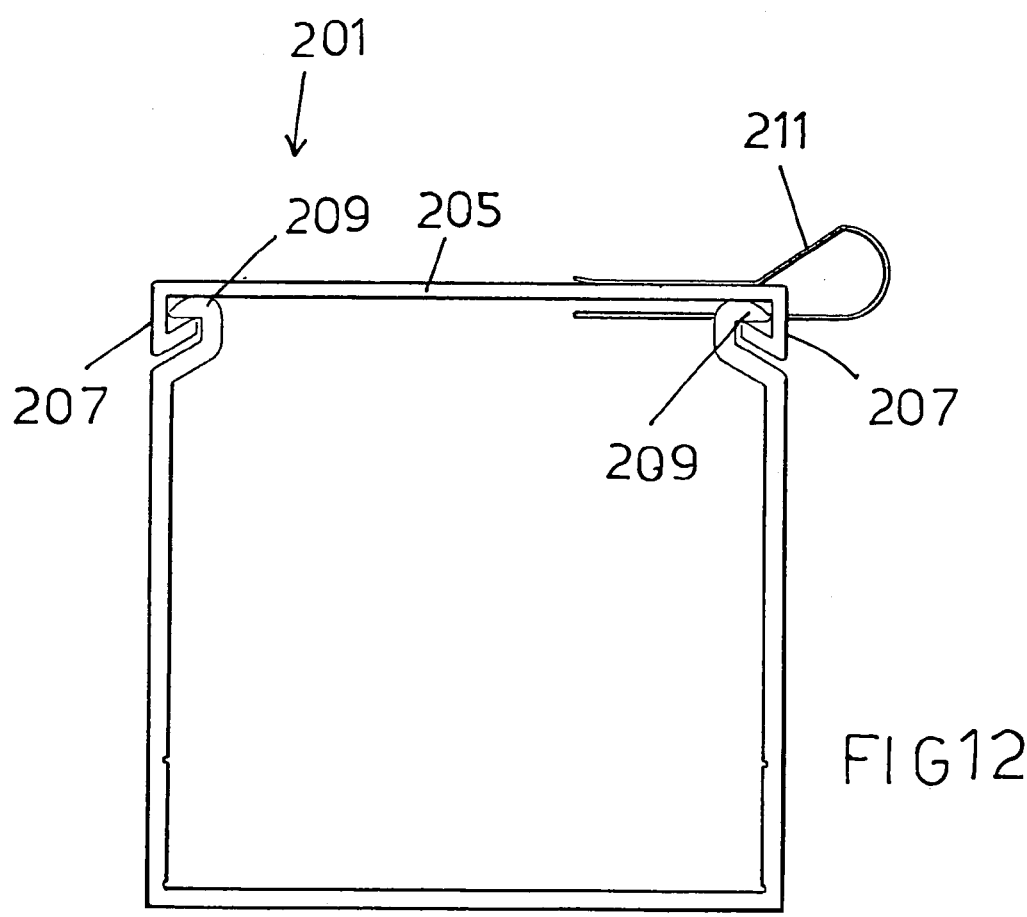
FIG. 12 is a front view of the raceway construction shown in the preceding figure.

FIGS. 11 and 12 show a raceway construction 201 including interference or hindering means according to a further aspect of the invention, said interference means including holes 206 formed at a desired pitch on the sidewall or downward turned edge portion 207 of the cover 205, at the slits between the tooth elements 209.

In one or more said holes 206 a clamp element 211 is engaged, adapted to be threaded in the slots between the tooth elements 209, thereby providing an obstacle to a possible slipping movement.

Figure 13:
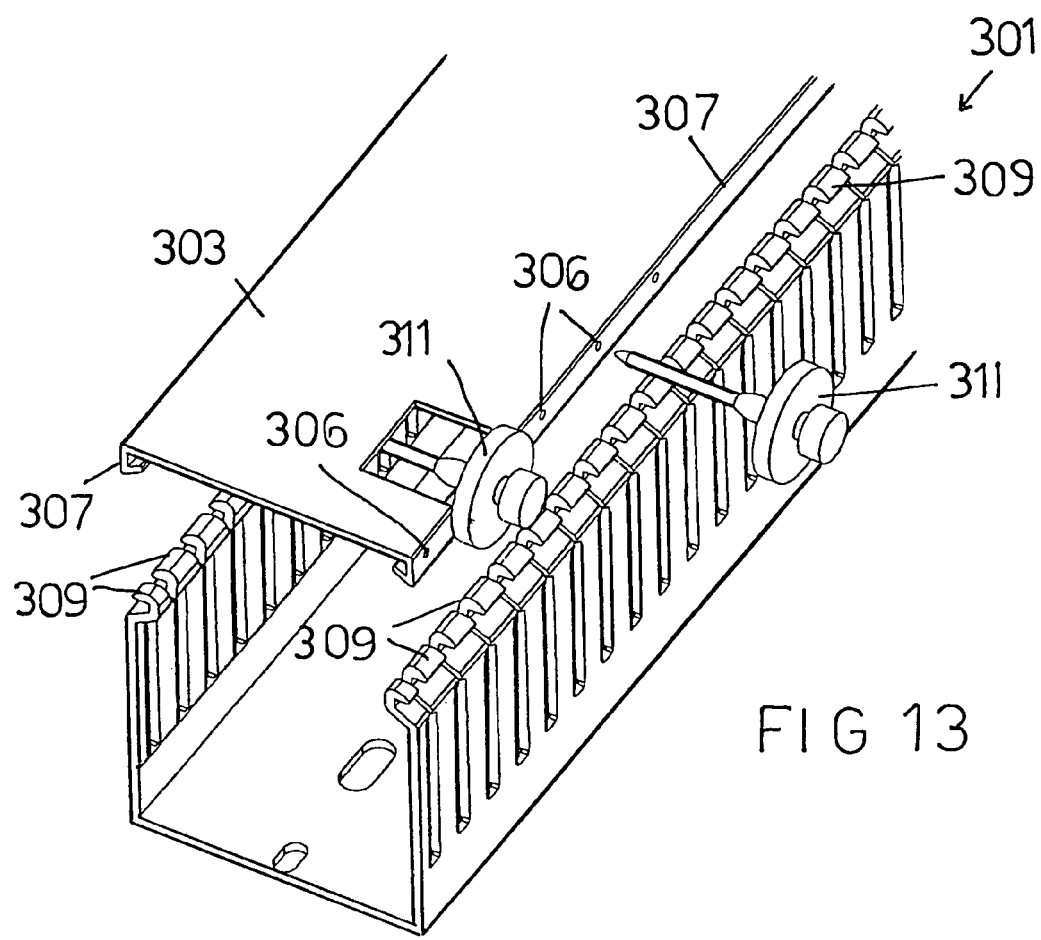
FIG. 13 is a further broken away perspective view of the cover applied to the raceway construction, according to a further aspect of the invention.
Figure 14:
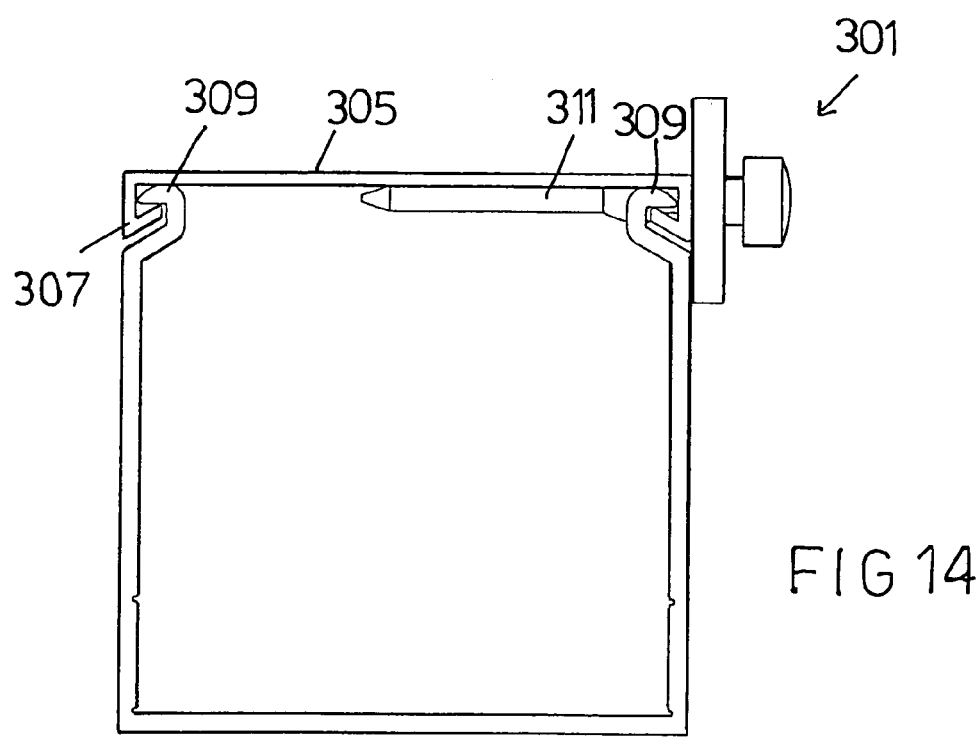
FIG. 14 is a front view of the raceway construction shown in FIG. 13.

FIGS. 13 and 14 show a raceway construction 301 including interference or hindering means, according to a further aspect of the invention, said interference or hindering means comprising a plurality of holes 306 formed at a desired pitch on the sidewall or downward turned edge portion 307 of the cover 305, at the slots between the tooth elements 309, as in the preceding embodiment.

In one or more said holes 306 is engaged a pin element 311, adapted to be threaded into the slot between the tooth elements 309, thereby providing a barrier for a possible slipping movement of the cover.

It has been practically found that the invention fully achieves the intended aim and objects.

In fact, the invention provides a raceway construction including antislipping means adapted to prevent the cover from slipping away under vibrations or impacts the raceway construction is subjected to.

In practicing the invention, the used materials, as well as the contingent size and shapes can be any, depending on requirements.

What is claimed is:

1. A raceway construction with an antislipping cover said raceway being adapted to hold cables and pipes, comprising a section member including a bottom wall and two sidewalls, which engage an aligned cover having downward turned cover edge portions, wherein said two sidewalls have a plurality of top adjoining curved tooth elements, each tooth elements being separated from an adjoining tooth element by a respective slot of one said tooth elements said aligned cover having interference means formed integrally with said aligned cover which are adapted to engage said curved tooth elements to prevent said aligned cover from longitudinally sliding away from said sidewalls.

2. A raceway construction, according to claim 1, wherein said interference means comprises a plurality of throughgoing cavities formed through said edge portion of said aligned cover, thereby allowing said curved tooth elements to be deformed to prevent the aligned cover from slipping away.

* * * * *